United States Patent [19]

DeWire et al.

[11] Patent Number: 5,076,317
[45] Date of Patent: Dec. 31, 1991

[54] ROTOR HANDLING SYSTEM FOR ROTARY VALVES

[75] Inventors: Fred C. DeWire, Hughesville; James E. Mothersbaugh; Galen S. Ingram, both of Muncy; Robert F. Flook, Williamsport, all of Pa.

[73] Assignee: The Young Industries, Inc., Muncy, Pa.

[21] Appl. No.: 572,628

[22] Filed: Aug. 27, 1990

[51] Int. Cl.⁵ .................................. F16K 43/00
[52] U.S. Cl. ........................ 137/315; 222/368
[58] Field of Search ............... 222/148, 368; 137/315; 406/65; 414/219; 251/304

[56] References Cited

U.S. PATENT DOCUMENTS

| | | | |
|---|---|---|---|
| 4,059,205 | 11/1977 | Heyl | 222/368 |
| 4,076,150 | 2/1978 | Didrickson | 222/368 |
| 4,600,032 | 7/1986 | Heyl | 222/368 |
| 4,602,727 | 7/1986 | Jackson | 222/368 |
| 4,948,017 | 8/1990 | Heep et al. | 222/368 |

Primary Examiner—George L. Walton
Attorney, Agent, or Firm—Lalos & Keegan

[57] ABSTRACT

In a rotary valve having a housing, a drive shaft journaled in the housing and having an end portion thereof projecting into a rotor chamber in the housing, a rotor mounted on a drive shaft and axially displaceable thereon and means for accessing the rotor to permit axial removal of the rotor from the rotor chamber, a rotor handling system comprising, a support means mounted on the housing, an assembly including a mandrel supported in the support means operable to axially register the mandrel with the drive shaft to permit the axial displacement of the rotor onto the mandrel, a carrier means mounted on the mandrel and axially displaceable thereon, a locking means mounted on the carrier member and selectively engageable with the rotor when the mandrel is disposed in axial alignment with the drive shaft for selectively locking the rotor to the carrier member and means operable for axially displacing the carrier means whereby upon the mandrel being axially registered with the drive shaft, the carrier member being disposed in locking relation with the rotor and axial displacing means being operated, the rotor will be caused to mvoe onto and off of the mandrel.

13 Claims, 5 Drawing Sheets

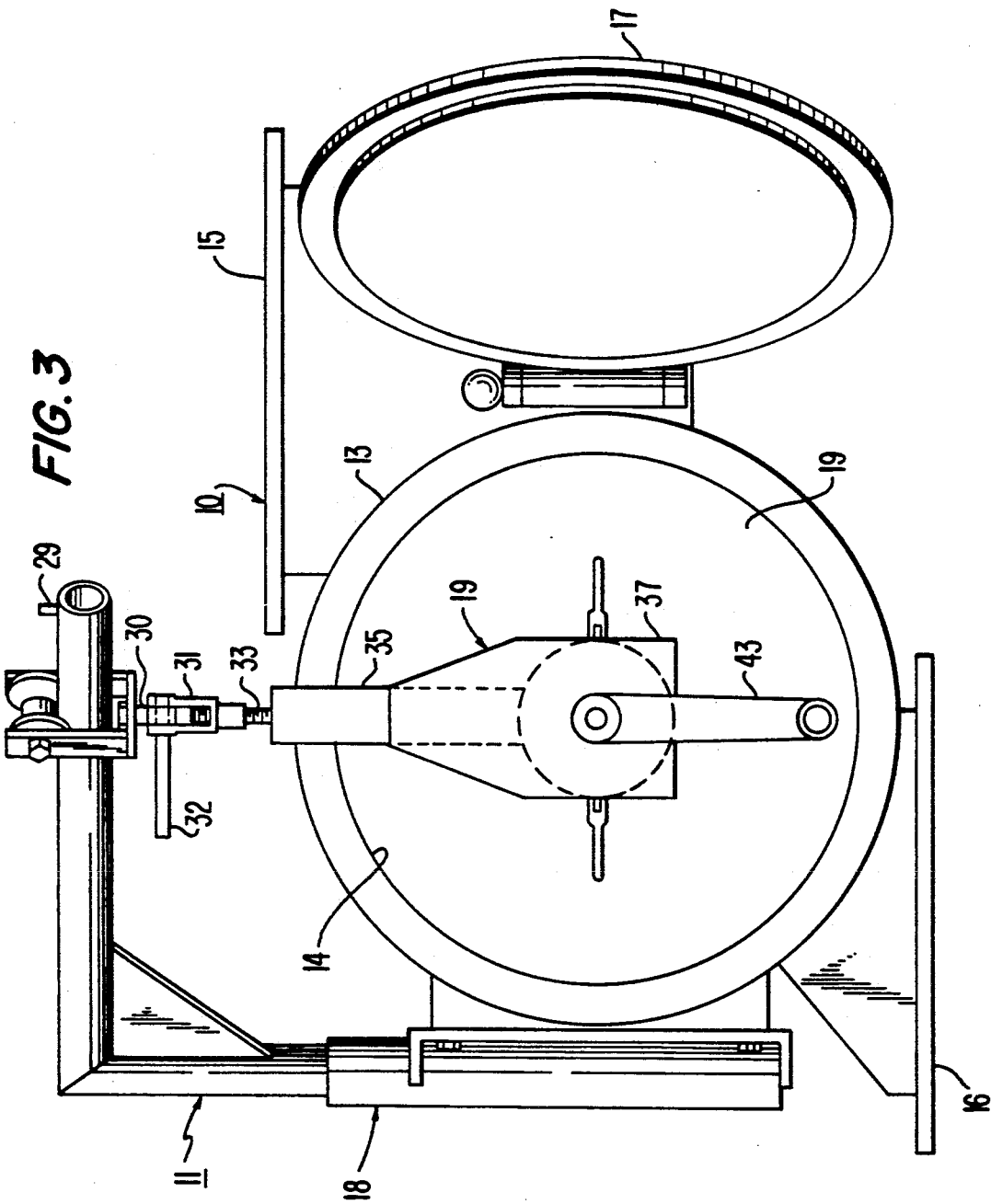

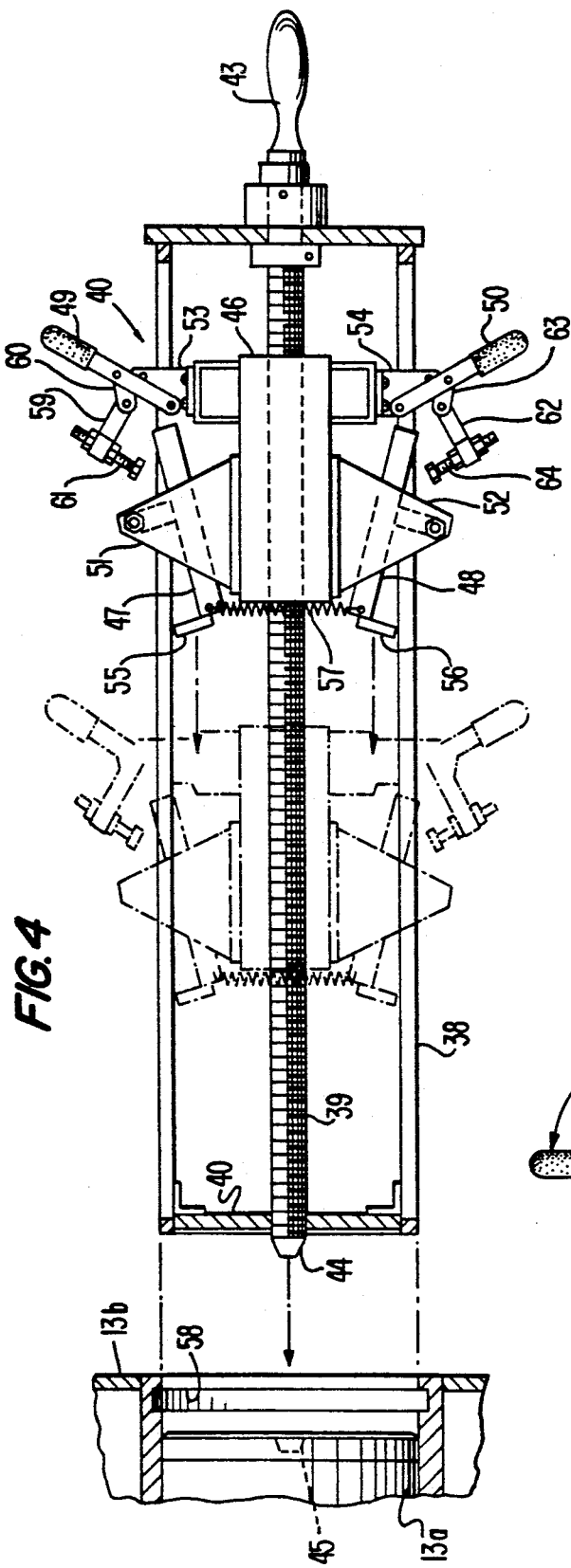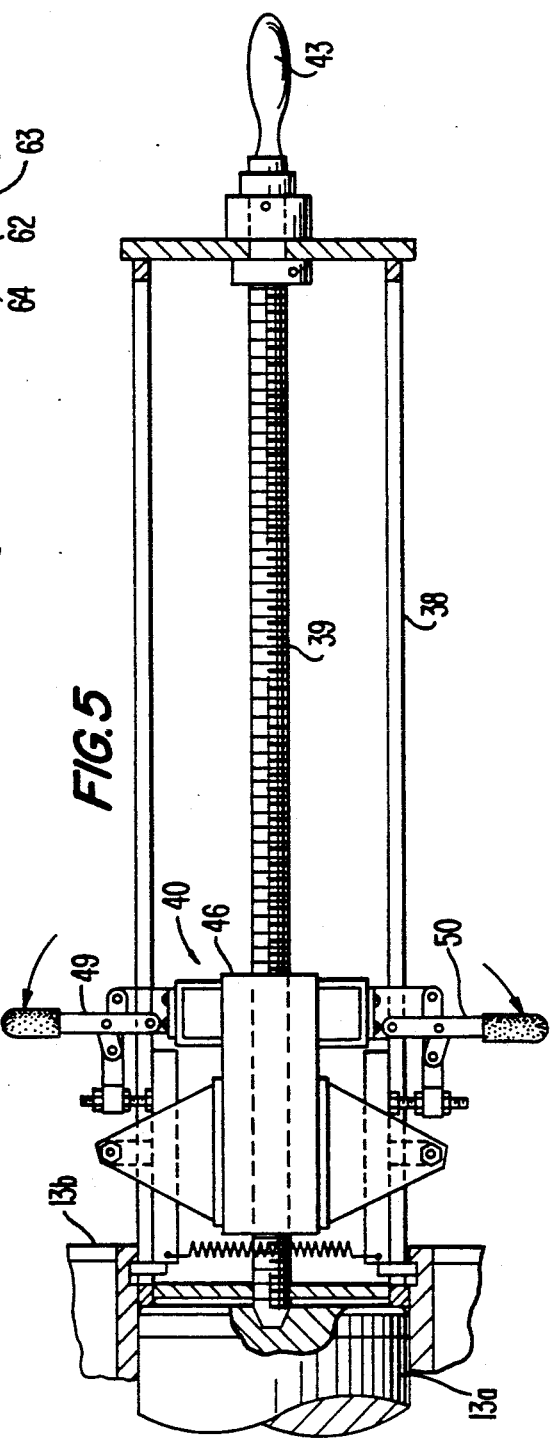

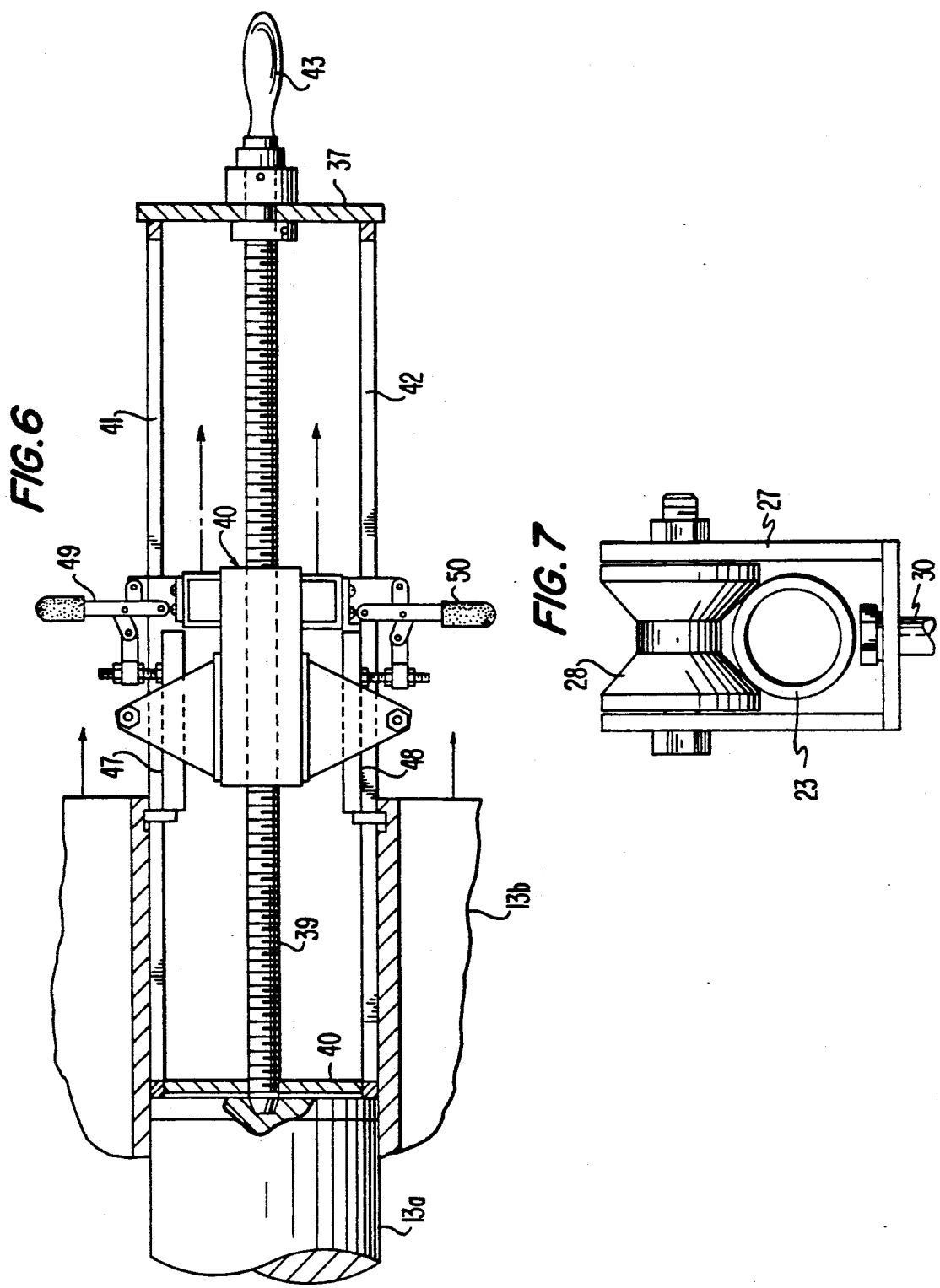

ROTOR HANDLING SYSTEM FOR ROTARY VALVES

This invention relates to a handling system which provides a safe and efficient means for a person to remove, support and return a cantilevered valve rotor without the use of other tools or equipment.

In many rotary valve applications, frequent cleaning of the internal valve parts is required, particularly in those applications which require the handling of foodstuff or a material which will not tolerate cross batch contamination. There exist rotary valves, such as that disclosed in U.S. Pat. No. 4,059,205, which employ a drive shaft having a free, cantilevered end. Such a drive shaft permits a rotor to be mounted on the free end of the drive shaft, thus allowing the rotor to be axially removed over the free end. This arrangement permits the rotor to be removed and cleaned without disturbing the seals of the valve.

When a cantilevered rotary valve has been in service for an extended period of time, fine particles of the product will enter the small clearance between the rotor and shaft, making it difficult for the operator to remove the rotor manually. Bars or other tools are often used to pry the rotor from the shaft, frequently damaging the machined surfaces of the rotor, shaft or valve housing.

Furthermore, the rotor requires support as it is being extracted to prevent the rotor from tilting and locking on the shaft or in the bore of the housing. Thus, more than one person typically is required to remove the rotor. Additionally, a safety hazard exists as the rotor is reinstalled on the shaft. The rotor must be lifted, centered on the housing and pushed onto the cantilevered shaft, creating a potential for back injury from lifting the rotor, as well as injury from pinching or cutting the hands in the sharp pinch points existing between the rotor and housing.

Accordingly, it is the principal object of the present invention to provide a novel handling system for cantilevered rotors of rotary valves.

Another object of the present invention is to provide a handling system which allows the safe removal, support and reassembly of a cantilevered valve rotor.

An additional object of the present invention is to provide a handling system which permits the removal and reassembly of a cantilevered valve rotor by a single operator.

A further object of the present invention is to provide a handling system which provides for the efficient removal and reassembly of a cantilevered valve rotor with minimal damage to the rotor, shaft or valve housing.

Other objects and advantages of the invention will become more apparent to those persons having ordinary skill in the art to which the present invention pertains from the following description taken in conjunction with the accompanying drawings in which:

FIG. 3 is an end view of the embodiment shown in FIGS. 1 and 2;

FIG. 4 is a cross-sectional view taken along line A—A in FIG. 2 depicting the embodiment of FIGS. 1 through 3 being positioned in place adjacent to the rotary valve;

FIG. 5 is a cross-sectional view taken along line A—A in FIG. 2 depicting the embodiment of FIGS. 1 through 3 engaging the rotor;

FIG. 6 is a cross-sectional view taken along line A—A in FIG. 2 depicting the embodiment of FIGS. 1 through 3 removing the rotor from the rotary valve; and FIG. 7 is an enlarged view taken along line B—B in FIG. 1.

Figure 1:
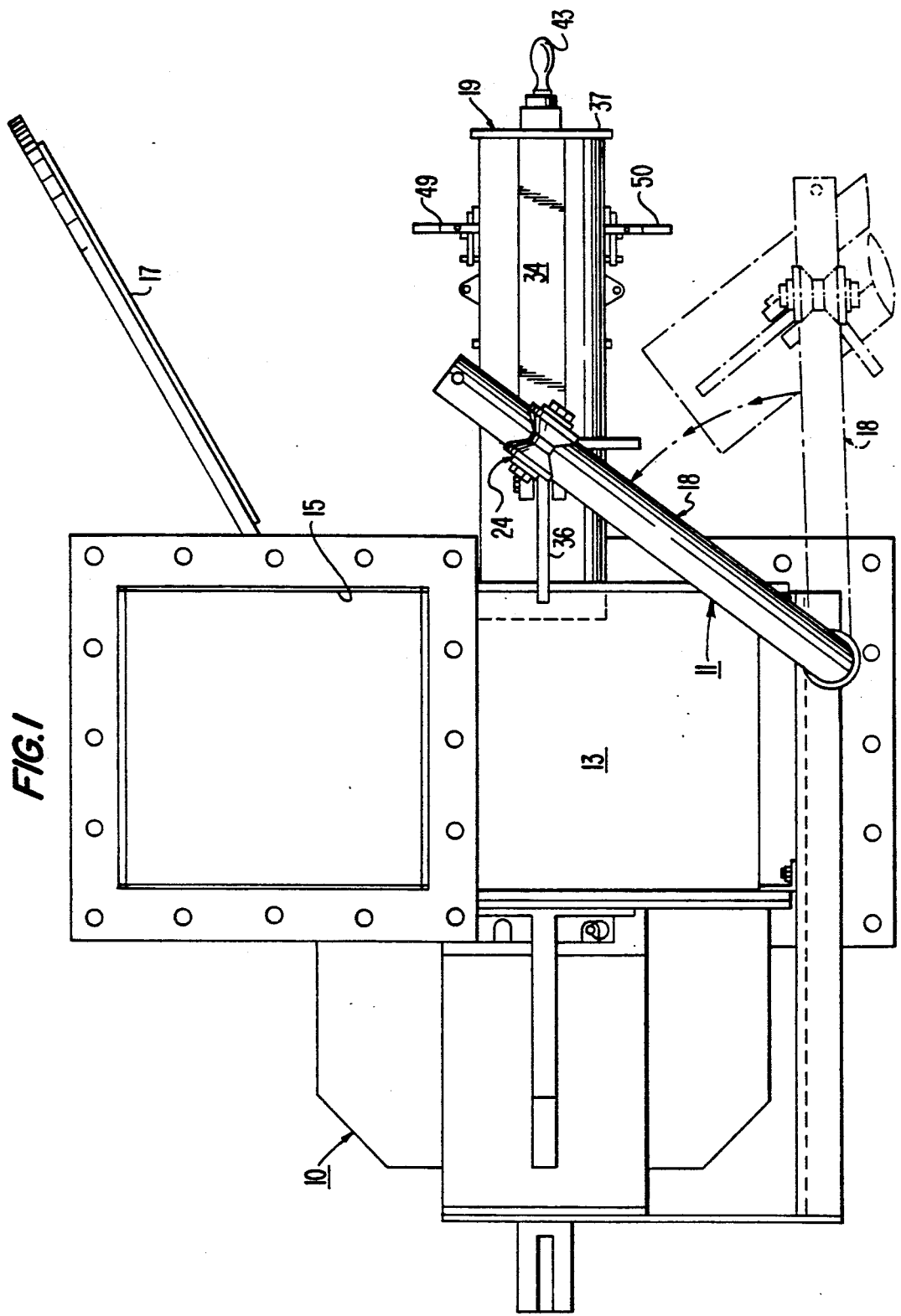
FIG. 1 is a top plan view of an embodiment of the invention positioned adjacent to a cantilevered rotary valve.

Referring to the drawings, there is illustrated a rotary valve 10 and a rotor handling system 11 mounted on the rotary valve and embodying the present invention. The rotary valve includes a housing 13 providing a rotor chamber 14 having a side material inlet 15, a side outlet 16 and an access end closed by a hinged cover plate or door 17. The valve further includes a shaft 13a journaled in the housing and having an end portion thereof projecting into the rotor chamber, and a rotor 13b mounted on the cantilevered portion of the drive shaft in the rotor chamber and axially displaceable thereon through the access opening. The valve is operable in the conventional manner to meter material therethrough, and the rotor is adapted to be removed from the rotor chamber for cleaning and replaced for subsequent operation.

Rotor handling system 11 consists of a support assembly 18 and a mandrel assembly 19. The support assembly includes a vertically disposed tubular member 20 rigidly secured to a side of the valve housing and an L-shaped member 21 having a vertically disposed tubular portion 22 received within the upper end of tubular member 20 and swivelable about the axis thereof, and a horizontally disposed tubular arm member 23 having a length sufficient to extend beyond the access opening of the valve housing in order to support the valve rotor when removed from the valve housing.

Figure 2:
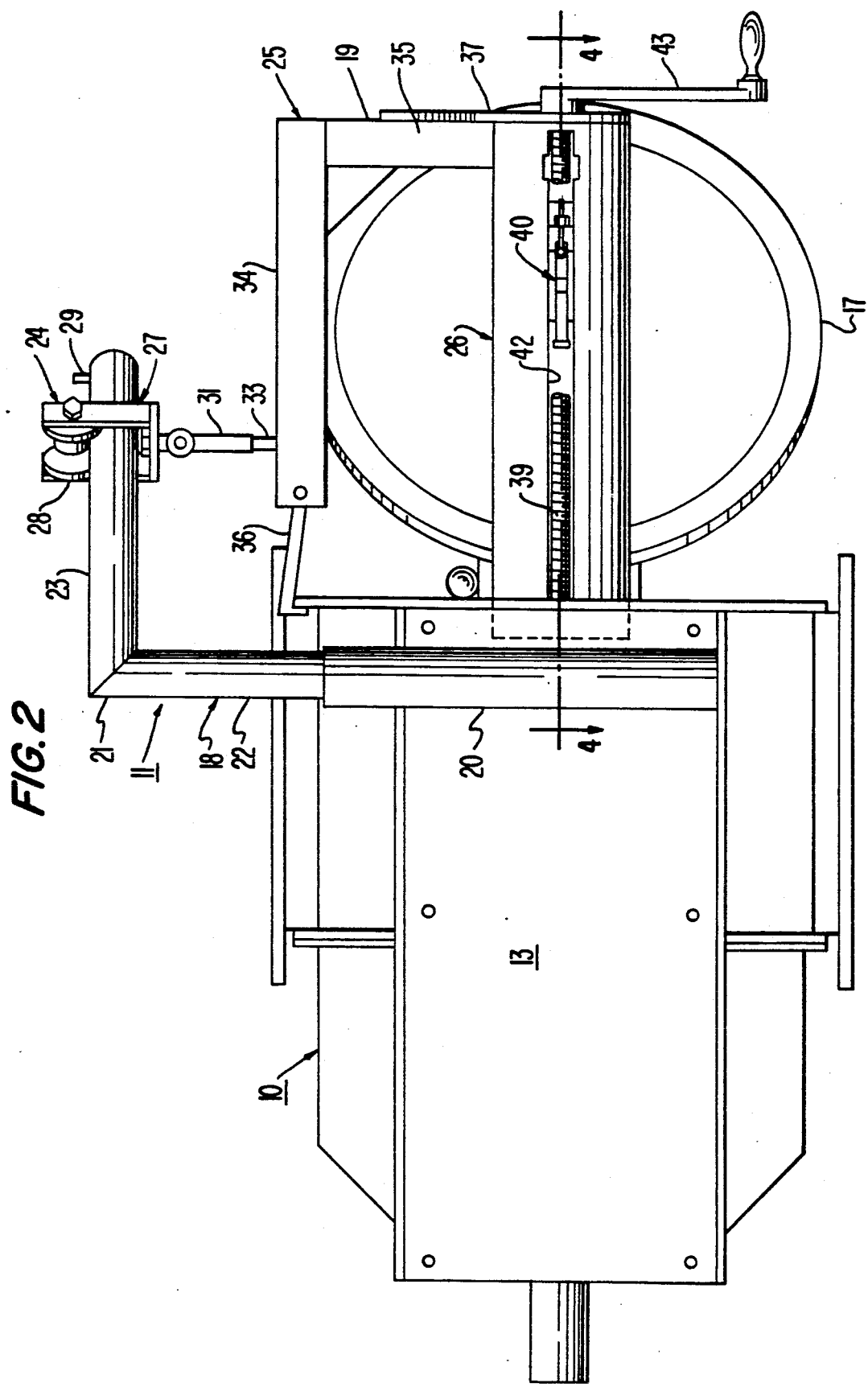
FIG. 2 is a side, elevational view of the embodiment shown in FIG. 1.

The mandrel assembly includes a mounting unit 24, a mandrel carrier bracket 25 depending from the mounting unit and a mandrel 26 rigidly mounted on the lower end of the carrier bracket. As best seen in FIGS. 2, 3 and 7, the mounting unit consists of an inverted yoke member 27 having a V-roller 28 journaled in the upper ends of the leg portions of the yoke member which straddle the sides of arm portion 23 to permit the mounting unit to ride along the upper side of the arm member. The mounting unit is prevented from rolling off of the free end of arm member 23 by means of a stop pin 29. Depending from the yoke member is a swivel bolt 30 on which there is swivelably mounted a height adjusting yoke 31 having a handle 32. Threaded into the lower end of the height adjusting yoke is a threaded member 33 which is rigidly connected to the mandrel carrier bracket. It will be appreciated that the mandrel assembly may be displaced radially relative to the vertical axis of tubular support member 20 by rolling the assembly along arm portion 23, and may be adjusted vertically by turning handle 32 of the height adjusting yoke.

The mandrel carrier bracket consists of an L-shaped member including a horizontal portion 34 and a vertical portion 35. As previously indicated, threaded member 33 is rigidly secured to horizontal portion 34 near the free end thereof to support the mandrel carrier bracket. The assembly is prevented from swinging away from the valve housing when in position to remove or replace the rotor by means of a latch 36 pivotally mounted on the free end of horizontal portion 34 and adapted to hook onto the edge of an end plate of the valve housing. The vertical portion of bracket 19 also is provided with a depending plate member 37 on which the mandrel is rigidly secured.

As best illustrated in FIGS. 4 through 6, mandrel 26 includes a cylindrical member 38, a feed screw 39 mounted on the cylindrical member and a locking mechanism 40 mounted on the feed screw and displaceable axially thereon. The cylindrical member is rigidly mounted on support plate 37, substantially parallel to the bracket portion 34, has an outside diameter substantially the same as the rotor shaft and is closed at its free end by an end wall 37a. The cylindrical member is adapted to be axially aligned with drive shaft 13a and be received within rotor 13b as best shown in FIGS. 5 and 6. The cylindrical member further is provided with a pair of diametrically opposed, longitudinally extending slots 41 and 42 for accommodating portions of the locking mechanism as will be described later. Feed screw 39 is journaled in depending plate member 37 and end plate 37a, axially relative to cylindrical member 38, and is adapted to be turned by means of a crank 43 mounted on an outer end thereof. As best shown in FIG. 4, the leading end of feed screw 39 is provided with a tapered portion 44 which is adapted to be received within a complementary recess 45 axially disposed in the outer end surface of drive shaft 13a for guiding the mandrel into axial alignment with the drive shaft when the mandrel is moved into an operative position for removing or installing the rotor.

Locking mechanism 40 consists of a carrier member 46, a pair of locking members 47 and 48 pivotally mounted on the carrier member and selectively engageable with the valve rotor and a pair of manually operated actuating levers 49 and 50 mounted on the carrier member and operatively engageable with the locking members to move them into locking positions. Carrier member 46 is provided with an internally threaded bore threaded onto the feed screw so that upon rotating the screw, the locking mechanism will be caused to be displaced axially within cylindrical member 38. The carrier member further is provided with a pair of forwardly disposed, laterally projecting brackets 51 and 52 which project through and are guided along longitudinal slots 41 and 42 in cylindrical member 38, and a pair of rearwardly disposed, laterally projecting brackets 53 and 54 also projecting laterally through and guided along the longitudinally disposed slots.

Locking members 47 and 48 are pivotally mounted on brackets 51 and 52 for pivotal movement in a plane passing through or substantially parallel to the axis of the feed screw. The locking members further are provided with laterally projecting locking elements 55 and 56 which normally are biased in positions within cylindrical member 38 by means of a retraction spring 57, and which are adapted to be pivoted outwardly by operation of actuating levers 49 and 50 to cause them to be received within an annular groove 58 formed in the bore of the rotor adjacent an outer end thereof.

Actuating lever 49 is pivotally mounted on bracket 53 and is connected to an arm member 59 also pivotally mounted on bracket 53, through a short link 60. It will be appreciated that upon moving actuating lever 49 in a counterclockwise direction relative to FIG. 4, an adjustable bolt 61 provided on the end of arm member 59 will be caused to engage the trailing end of locking member 47 to pivot locking element 55 laterally through slot 41 and into groove 58 when the locking element is in lateral alignment with the groove. Actuating lever 50 similarly is pivotally connected to bracket 54 and is connected to an arm member 62 pivotally connected to bracket 54, through a short link 63. Also upon pivoting actuating lever 50 in a clockwise direction relative to FIG. 4, an adjustable bolt 64 mounted on the end of arm member 62 will engage locking member 48 to pivot locking element 56 outwardly against the biasing action of retraction spring 57.

In the normal operating condition, rotor 13b is mounted on the cantilevered end of drive shaft 13a within the rotor chamber with the access door in the closed position for receiving and metering material through the valve. When it is desired to take the valve out of service for the purpose of cleaning the valve, the handling system is first swung away from the valve to permit the opening of the access door. The handling system is then swung around in front of the exposed rotor and the mandrel is aligned axially with the drive shaft. Such alignment can be accomplished by swinging arm portion 23 to generally position the mandrel in front of the drive shaft, moving the mandrel toward the drive shaft by rolling it along arm portion 23 and adjusting the height by turning handle 32 to move the mandrel support bracket up or down. The support assembly generally is anchored in the position as described by use of latch 36.

With the mandrel in the position as shown in FIG. 4, it is moved toward the end of the drive shaft so that the tapered end portion 44 of the feed screw is received within guide recess 45 in the end of the drive shaft. The crank is then operated to advance the locking mechanism to the position as shown in FIG. 5 and the actuating levers are pivoted in the directions shown by the arrows to pivot the locking members laterally outwardly so that locking elements 55 and 56 are received within recess 58 provided in the rotor bore. With the actuating levers in the positions as shown in FIG. 5, the locking members will be clamped in position to prevent the retraction of the locking elements. The crank is then rotated in the opposite direction to cause the locking mechanism to move outwardly thus displacing the rotor outwardly and onto the cylindrical member of the mandrel Once the rotor is entirely removed from the rotor chamber and supported on the mandrel, the rotor may be cleaned while suspended from arm portion 23. The rotor in the suspended condition also can be turned to facilitate the cleaning operation.

After the rotor has been cleaned and it is desired to replace it in the valve housing, the aforementioned process essentially is reversed. The mandrel is first axially aligned with the drive shaft by positioning the tapered leading portion 44 of the feed screw in recess 45 of the drive shaft, the support assembly is latched to the housing and then the crank is operated to cause the locking mechanism to move the rotor off of the mandrel and onto the cantilevered drive shaft within the rotor chamber. With the rotor fully inserted, actuating levers 49 and 50 are pivoted in directions opposite from the directions shown by the arrows in FIG. 5 to permit retraction spring 57 to move locking elements 55 and 56 out of locking engagement with annular groove 58. The handling system is then in condition to be unlatched and pivoted out of the way to permit the access door to be closed and secured and thus permit normal operation of the valve.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. In a rotary valve having a housing, a drive shaft journaled in said housing and having an end portion thereof projecting into a rotor chamber in said housing, a rotor mounted on said drive shaft and axially displaceable thereon and means for accessing said rotor to permit axial removal of said rotor from said rotor chamber, a rotor handling system comprising:

support means mounted on said housing;

an assembly including a mandrel supported by said support means operable to axially position said mandrel with said drive shaft to permit the axial displacement of said rotor onto said mandrel;

carrier means mounted on said mandrel and axially displaceable thereon;

locking means mounted on and axially displaceable with said carrier means and selectively engageable with said rotor when said mandrel is disposed in said axial position with said drive shaft for selectively locking said rotor to said carrier means; and means operable for axially displacing said carrier means, such that when said mandrel is axially positioned with said drive shaft, said carrier means is disposed in locking relation with said rotor and said axial displacing means is operated, thereby said rotor will be caused to move axially along said mandrel to permit axial removal of said rotor from said rotor chamber.

2. A handling system according to claim 1 wherein said mandrel assembly is displaceable along a horizontal line of travel relative to said support means.

3. A handling system according to claim 1 wherein said support means is displaceable angularly relative to said valve housing.

4. A handling system according to claim 1 wherein said mandrel assembly is displaceable vertically relative to said support means.

5. A handling system according to claim 1 wherein said mandrel assembly includes means for anchoring said mandrel assembly to said housing.

6. A handling system according to claim 1 wherein said mandrel includes means operatively engageable with said drive shaft for guiding said mandrel into axial alignment with said drive shaft.

7. A handling system according to claim 1 wherein said locking means includes at least one laterally displaceable element engageable with said rotor.

8. A handling system according to claim 7 wherein said locking element includes a protruding portion receivable in a recess disposed in said rotor.

9. A handling system according to claim 8 wherein said protruding portion is receivable in an annular groove provided in an axial bore of said rotor.

10. A handling system according to claim 7 wherein said locking means includes a lever mechanism operable to displace said locking element laterally.

11. A handling system according to claim 9 wherein said guide means includes an axially protruding portion of said mandrel receivable in an axially disposed recess in said drive shaft.

12. A handling system according to claim 1 wherein said mandrel assembly includes a feed screw operatively connected to said carrier means for displacing said carrier means axially.

13. A handling system according to claim 12 wherein said feed screw is provided with a manually operable crank.

* * * * *